United States Patent
Lim et al.

(10) Patent No.: US 10,152,359 B2
(45) Date of Patent: Dec. 11, 2018

(54) LOAD BALANCING METHOD FOR MULTICORE MOBILE TERMINAL

(71) Applicants: Samsung Electronics Co., Ltd., Gyeonggi-do (KR); Research & Business Foundation, Sungkyunkwan University, Gyeonggi-do (KR)

(72) Inventors: Geunsik Lim, Seoul (KR); Young Ik Eom, Seoul (KR)

(73) Assignees: Samsung Electronics Co., Ltd (KR); Research & Business Foundation Sungkyunkwan University (KR)

(\*) Notice: Subject to any disclaimer, the term of this patent is extended or adjusted under 35 U.S.C. 154(b) by 359 days.

(21) Appl. No.: 13/932,489

(22) Filed: Jul. 1, 2013

(65) Prior Publication Data

US 2014/0181834 A1    Jun. 26, 2014

(30) Foreign Application Priority Data

Dec. 20, 2012 (KR) .................. 10-2012-0149451

(51) Int. Cl.
*G06F 9/46* (2006.01)
*G06F 9/50* (2006.01)

(52) U.S. Cl.
CPC .... *G06F 9/5088* (2013.01); *G06F 2209/5022* (2013.01); *Y02D 10/32* (2018.01)

(58) Field of Classification Search
CPC ........ G06F 9/50; G06F 9/5088; G06F 9/5083; G06F 9/5094; G06F 9/5072; G06F 9/505; G06F 9/5011
See application file for complete search history.

(56) References Cited

U.S. PATENT DOCUMENTS

| | | | | |
|---|---|---|---|---|
| 4,974,256 A * | 11/1990 | Cyr | ....................... | H04M 3/365 379/112.04 |
| 5,655,120 A * | 8/1997 | Witte | ..................... | G06F 9/505 379/112.04 |
| 7,155,722 B1 * | 12/2006 | Hilla | ...................... | G06F 9/505 709/223 |
| 7,665,092 B1 * | 2/2010 | Vengerov | .............. | G06F 9/5088 718/105 |
| 7,941,805 B2 * | 5/2011 | Dillenberger | ........... | G06F 9/505 709/224 |
| 8,108,875 B2 * | 1/2012 | Dillenberger | ........... | G06F 9/505 709/224 |
| 8,516,492 B2 * | 8/2013 | Vaddagiri | ............. | G06F 9/5088 714/13 |
| 8,612,580 B2 * | 12/2013 | Gandhi | ................. | G06F 9/5027 709/224 |
| 9,367,340 B2 * | 6/2016 | Wang | ...................... | G06F 9/455 |
| 9,874,926 B2 * | 1/2018 | Hum | ...................... | G06F 1/3203 |
| 2004/0186904 A1 * | 9/2004 | Oliveira | ................. | G06F 9/505 709/225 |

(Continued)

*Primary Examiner* — Hiren P Patel
(74) *Attorney, Agent, or Firm* — The Farrell Law Firm, P.C.

(57) ABSTRACT

Methods and apparatus are provided for load-balancing in a portable terminal having a plurality of Central Processing Units (CPUs). A utilization is calculated for each of the plurality of CPUs, when a state of a task is changed. An average of the utilizations of the plurality of CPUs is calculated. It is determined whether the average exceeds a predetermined threshold. Load-balancing is performed when the average exceeds the predetermined threshold.

6 Claims, 9 Drawing Sheets

(56) References Cited

U.S. PATENT DOCUMENTS

| | | | |
|---|---|---|---|
| 2005/0155032 A1* | 7/2005 | Schantz | G06F 9/505 718/100 |
| 2005/0160424 A1* | 7/2005 | Broussard | G06F 9/5072 718/1 |
| 2005/0229177 A1* | 10/2005 | Torii | G06F 9/4887 718/100 |
| 2006/0095909 A1* | 5/2006 | Norton | G06F 9/4881 718/100 |
| 2006/0168254 A1* | 7/2006 | Norton | G06F 9/3851 709/229 |
| 2006/0253853 A1* | 11/2006 | Jiang | G06F 9/4887 718/100 |
| 2007/0043347 A1* | 2/2007 | Solomita | G06F 9/4812 606/33 |
| 2008/0046895 A1* | 2/2008 | Dillenberger | G06F 9/505 718/105 |
| 2008/0307425 A1* | 12/2008 | Tripathi | G06F 9/5077 718/104 |
| 2009/0327909 A1* | 12/2009 | Hayton | G06F 21/6218 715/744 |
| 2009/0328050 A1* | 12/2009 | Liu | G06F 9/5088 718/104 |
| 2010/0332658 A1* | 12/2010 | Elyashev | G06F 9/505 709/226 |
| 2011/0191783 A1* | 8/2011 | Le Moal | G06F 9/5077 718/105 |
| 2012/0047383 A1* | 2/2012 | Laor | G06F 1/3287 713/324 |
| 2012/0109622 A1* | 5/2012 | Greiner | G06F 9/30003 703/26 |
| 2012/0117567 A1* | 5/2012 | Amano | G06F 9/5083 718/1 |
| 2012/0222036 A1* | 8/2012 | Yoshimura | H04N 1/0092 718/103 |
| 2012/0254443 A1* | 10/2012 | Ueda | H04L 67/1008 709/226 |
| 2012/0271481 A1* | 10/2012 | Anderson | G06F 1/206 700/299 |
| 2012/0272025 A1* | 10/2012 | Park | G06F 3/0608 711/162 |
| 2012/0324444 A1* | 12/2012 | Gulati | G06F 9/5088 718/1 |
| 2013/0054809 A1* | 2/2013 | Urmanov | G06F 9/505 709/226 |
| 2013/0145364 A1* | 6/2013 | Yang | G06F 9/45558 718/1 |
| 2013/0174152 A1* | 7/2013 | Yu | G01R 21/00 718/1 |
| 2013/0239115 A1* | 9/2013 | Kato | G06F 9/5061 718/104 |
| 2013/0283279 A1* | 10/2013 | Brandt | G06F 9/4887 718/102 |
| 2013/0318379 A1* | 11/2013 | Seshadri | G06F 9/5094 713/320 |
| 2013/0332608 A1* | 12/2013 | Shiga | G06F 9/5088 709/226 |

* cited by examiner

LOAD BALANCING METHOD FOR MULTICORE MOBILE TERMINAL

PRIORITY

This application claims priority under 35 U.S.C. § 119(a) to a Korean patent application filed on Dec. 20, 2012 in the Korean Intellectual Property Office and assigned Serial No. 10-2012-0149451, the entire disclosure of which is incorporated herein by reference.

BACKGROUND OF THE INVENTION

1. Field of the Invention

The present invention relates generally to a load-balancing method in a mobile terminal, and more particularly, to a load-balancing method for equalizing the utilization rate of each of the Central Processing Units (CPUs) in a portable terminal having multi-cores (e.g., a plurality of CPUs).

2. Description of the Related Art

Embedded devices have typically had a simple structure, and thus, have successfully performed a certain mission. For example, a phone has successfully performed a simple calling function, and a TV has successfully performed a simple TV viewing function. However, recently, manufacturers of the embedded devices have adopted multi-core based high-performance smart embedded devices. Embedded devices are also rapidly moving from the traditional single core to a multi-core. In particular, as the business trend of the portable terminal market is changed, load balancing technologies in an Operating System (OS) level are becoming more important for high performance and power management in a multi-core based embedded mobile environment.

An existing load balancer periodically performs a load-balancing operation when a load is not in a balanced state in order to maintain the optical CPU utilization rate. This scheme generates unnecessary task migration even though the CPU utilization rate is not 100%.

If the CPU load is not balanced (i.e., the utilization rates of the CPUs are not equal), a current Linux™ multicore scheduler performs load balancing to resolve load inequality of the multicore.

Based on the profiling and analysis on the operation structure of the existing load balancer, the multicore-based portable terminal has losses such as, for example, cache invalidation, a scheduling latency, power consumption, etc. The conventional load balancer performs load balancing by periodically checking whether the loads of the CPUs are unequal. The conventional load balancer checks the number of tasks that are being performed and are on the run queue of the CPU, and delays the number of times the load balance( ) function is called based on the checked number, thereby minimizing the costs generated due to load balancing. However, whenever load balancing occurs in the CPU, a task migration is performed, and the costs are not considered. However, whenever the loads of the CPUs become unbalanced, task migration is still performed and such costs are not considered. In the multi-core environment, the task migration more frequently occurs if there are more unbalanced situations for the loads of the CPUs. If the migration kernel threshold having the highest priority in the CPU performs double locking for the task allocated to the threshold before performing task migration, other tasks non-voluntarily lose the priority. As the tasks that frequently use CPUs increase, task migration more frequently occurs. As a result, the conventional load balancing method for equalizing CPU utilization rates increases the costs of cache invalidation, scheduling latency, power consumption, etc.

SUMMARY OF THE INVENTION

The present invention has been made to address at least the above problems and/or disadvantages and to provide at least the advantages described below. Accordingly, an aspect of the present invention provides a method and portable terminal for flexibly performing load-balancing based on the utilization rate of a CPU.

In accordance with an aspect of the present invention, a load-balancing method is provided in a portable terminal having a plurality of CPUs. A utilization is calculated for each of the plurality of CPUs, when a state of a task is changed. An average of the utilizations of the plurality of CPUs is calculated. It is determined whether the average exceeds a predetermined threshold. Load-balancing is performed when the average exceeds the predetermined threshold.

In accordance with another aspect of the present invention, a load-balancing method is provided in a portable terminal having a plurality of CPUs. A utilization is calculated for each of the plurality of CPUs, when a state of a task is changed. One or more of the plurality of CPUs are determined that need a utilization reduction based on the utilizations of the plurality of CPUs and a load-balancing policy that is set in the portable terminal. Task migration is performed for at least one task allocated to the one or more of the plurality of CPUs that needs the utilization reduction to another of the plurality of CPUs.

In accordance with another aspect of the present invention, a portable terminal is provided that includes a secondary memory, and a main memory for storing programs loaded from the secondary memory. The portable terminal also includes a plurality of CPUs for accessing the main memory, decrypting commands of the programs, and executing a function according to a result of the decryption. When a state of a task is changed, at least one of the plurality of CPUs calculates utilizations of the plurality of CPUs, calculates an average of the utilizations of the plurality of CPUs, determines whether the average exceeds a predetermined threshold, and performs load-balancing when the average exceeds the predetermined threshold.

In accordance with another aspect of the present invention, a portable terminal is provided that includes a secondary memory, and a main memory for storing programs loaded from the secondary memory. The portable terminal also includes a plurality of CPUs for accessing the main memory, decrypting commands of the programs, and executing a function according to a result of the decryption. When a state of a task is changed, at least one of the plurality of CPUs calculates a utilization for each of the plurality of CPUs, determines one or more of the plurality of CPUs that need a utilization reduction based on the utilizations of the plurality of CPUs and a preset load-balancing policy, and performs task migration of at least one task allocated to the one or more of the plurality of CPUs that need the utilization reduction to another of the plurality of CPUs.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
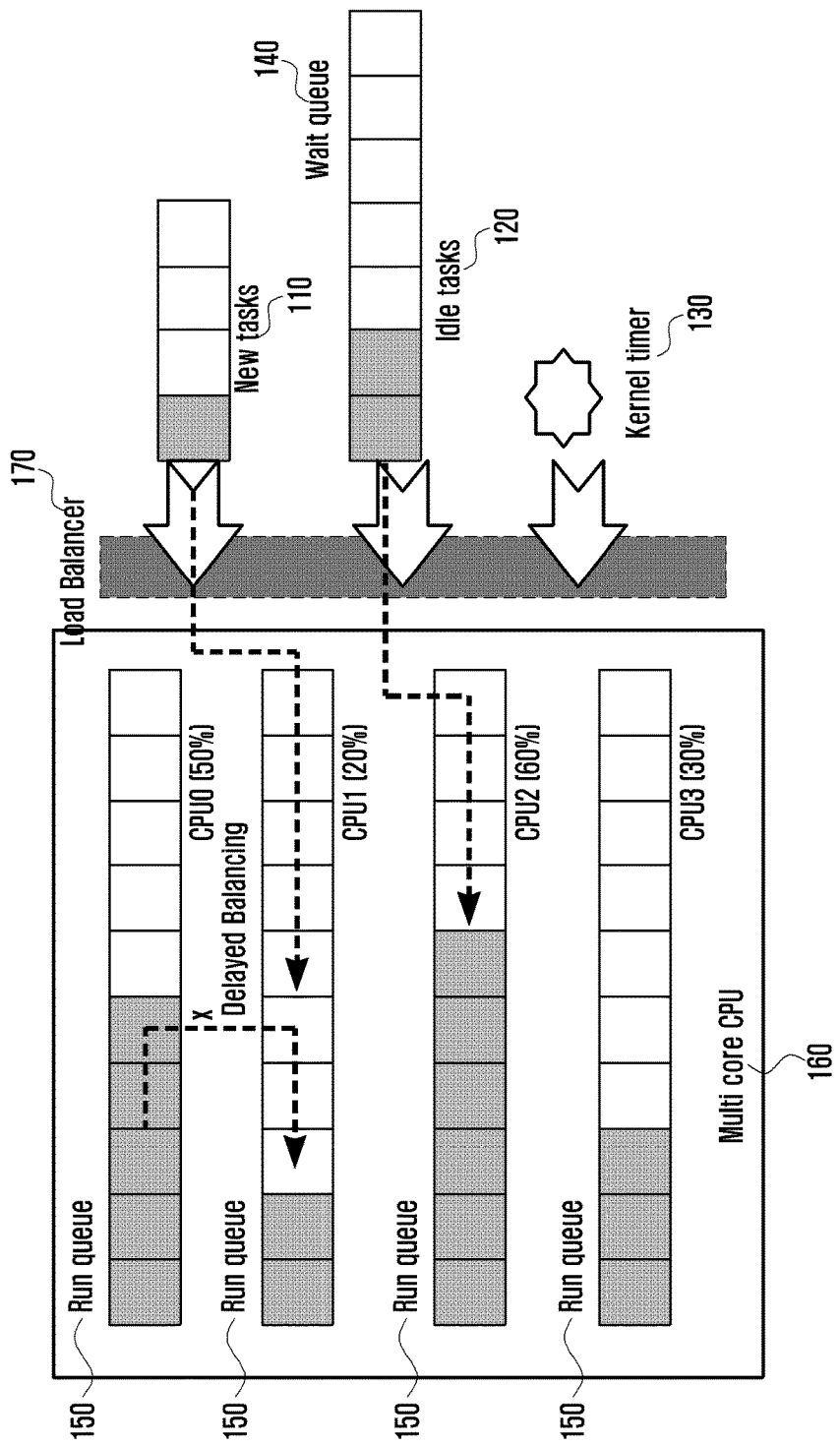
FIG. 1 is a diagram illustrating an operation zone based load balancer, according to an embodiment of the present invention.

Embodiments of the present invention are described in detail with reference to the accompanying drawings. The same or similar components may be designed by the same or similar reference numerals although they are illustrated in different drawings. Detailed descriptions of constructions or processes known in the art may be omitted to avoid obscuring the subject matter of the present invention.

A method and an apparatus according to embodiments of the present invention are applied to electronic devices such as, for example, a server, a Personal Computer (PC), etc. In particular, a method and an apparatus, according to embodiments of the present invention, are applied to a portable terminal such as, for example, a smart phone, a tablet PC, a notebook PC, etc.

In an embodiment of the present invention, load-balancing equalizes utilizations of respective CPUs. In particular, load-balancing includes task migration.

In an embodiment of the present invention, the utilization is defined as the ratio of the maximum value of tasks, which may be stored in a run queue, to the number of tasks in the current run queue. A task is a basic unit of a program controlled by an operating system. Further, the run queue is a kind of a register that exists inside a CPU. Tasks to be processed by the CPU are stored in the run queue. The run queue includes priority values for each of the tasks. The scheduler determines the processing order of tasks using the priority values. Specifically, a task having a higher priority is run first. If the operation is completed, the task is changed into the last order. The task is removed from the queue when the program is turned from the active mode to the sleep mode or when the program is terminated. Specifically, as the number of programs under operation increases, the number of the tasks occupying the run queue increases, and CPU utilization increases.

Further, utilization of a CPU may be defined as the ratio of one period (e.g., 1 second) to a time for which the CPU does not work, i.e., an idle time. The utilization of a CPU may also be defined as the ratio of the maximum speed of the CPU to the current speed. A representative unit that represents the speed of the CPU is a clock, and the clock is indicated in Hertz (Hz) after measuring how many steps of tasks are processed inside the CPU per second. For example, the fact that the maximum clock frequency of a CPU is 3.2 GHz means that the CPU generates digital signals of 0 or 1 at a cycle of 3.2 billion times per second. Such a clock frequency is variable. If the utilization of the CPU 3.2 GHz is 50%, the current clock frequency of the CPU is 1.6 GHz.

FIG. 1 is a diagram illustrating an operation zone based load balancer based on an operation zone, according to an embodiment of the present invention.

The load balancer, according to an embodiment of the present invention, determines whether the status of a task has been changed. If the status of the task is changed, the load balancer determines whether load-balancing is needed. Specifically, referring to FIG. 1, the load balancer determines whether load-balancing is needed when a new task is generated. Further, the load balancer determines whether load-balancing is needed if a task in an idle state is reawakened. The load balancer determines whether load-balancing is needed if the task under execution belongs to the busiest scheduling group. When there are four CPUs, the CPUs may be bound as one group, which is referred to as a scheduling group. A scheduling group having the highest CPU utilization among such scheduling groups is the busiest scheduling group. If the current utilizations of respective CPUs are not excessively unequal (e.g., unless the utilization difference of two CPUs is greater than 50%), load-balancing is delayed. A heavy double lock overhead may be minimized and power consumption of the battery may be reduced by avoiding frequent unnecessary task migration. In addition, a worst-case scenario, i.e., when the utilization of a certain CPU exceeds 100%, is controlled.

Figure 2:
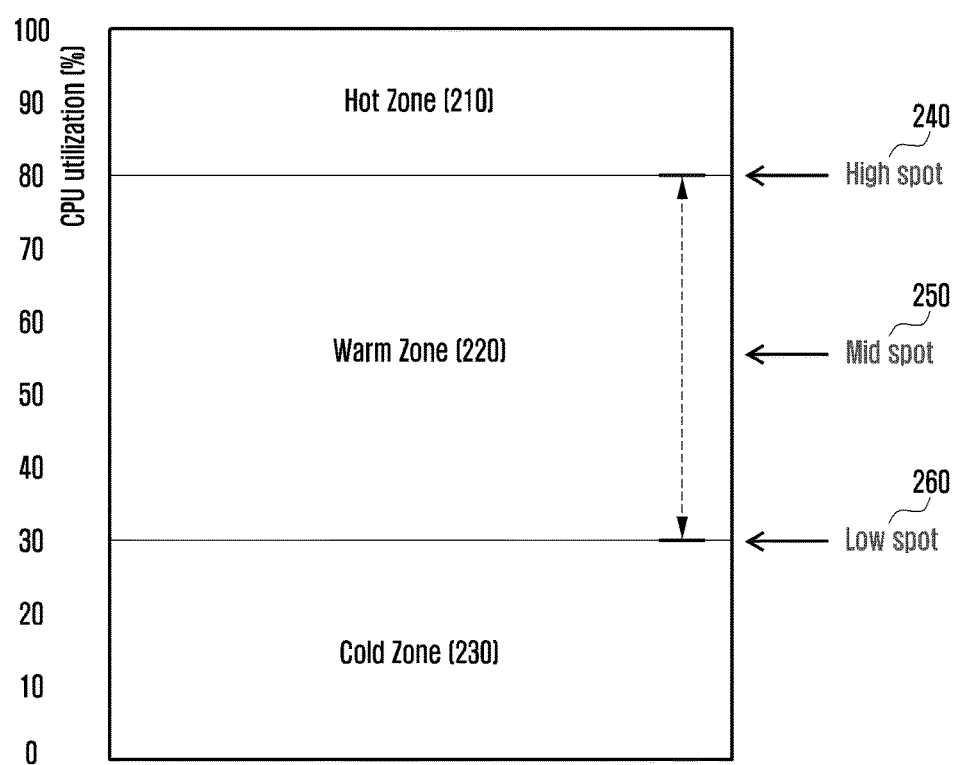
FIG. 2 is a diagram illustrating a load-balancing policy, according to an embodiment of the present invention.

FIG. 2 illustrates a load-balancing policy, according to an embodiment of the present invention.

The load-balancing operation zone is composed of three multi-core scheduling control areas to control the utilization of the CPU. Devices of a cold zone policy mostly have a very low CPU utilization, and thus, load-balancing should be performed smoothly. A device of a hot zone policy has a high CPU utilization, and thus, load-balancing should be diligently performed. Task management is very important in the devices of the middle-level warm zone policy. Referring to FIG. 2, if the utilization of the CPU≤30%, it is a cold zone, if 30%<utilization≤80%, it is a warm zone, and if 80%<utilization, it is a hot zone.

If a system administrator determines the policy, the apparatus performs load-balancing based on the determined policy. Such a load-balancing method is not simple. For example, if the utilization of the CPU continually fluctuates, load-balancing is frequently performed. Specifically, unnecessary load-balancing occurs. Hereinafter, various embodiments for preventing the occurrence of unnecessary load-balancing by such a fluctuation are described.

In a device that follows the cold zone policy, if the current CPU utilization corresponds to the cold zone, load-balancing is not performed. For example, it is assumed that, if the CPU utilization≤30%, it is a cold zone, and the utilization of CPU 0 is 10% and the utilization of CPU 1 is 5%. Both utilizations correspond to the cold zone, and thus, load-balancing is not performed. If the utilization of CPU 0 rapidly increases from 10% to 35%, load-balancing is performed for CPU 0. For example, the task in the run queue of CPU 0 is migrated to CPU 1. This policy is advantageous in that the battery life may be extended and CPU utilization may be effectively managed in a device having a high CPU utilization in only a few special cases and having a low CPU utilization in most of cases.

A hot zone policy is applied in a device having a high CPU utilization. If the CPU utilization corresponds to the hot zone in a device that follows the hot zone policy, load-balancing is performed. In contrast, if the CPU utilization does not correspond to the hot zone, load-balancing is not performed. Specifically, if there is a load inequality between CPUs, load-balancing is not promptly performed and is deferred until the CPU utilization reaches the hot zone. Hence, the device that follows the hot zone may avoid many task migrations.

Referring to FIG. 2, the warm zone has a low spot, a mid spot and a high spot. For example, a low spot is 30%, a mid spot is 60% and a high spot is 80%. In a warm zone policy, a user selects one of the spots to minimize the costs of the load-balancing operation for tasks whose CPU utilization is very active. The high spot is the highest utilization in the warm zone. The low spot is the lowest utilization in the warm zone. The mid spot is the utilization between the high spot and the low spot. The defined spots are values for the role that controls the usage of the CPU. In a device having the warm zone policy, the weight-based scores according to the time that the task uses the CPU is applied to tasks. The CPU utilization gets bonus points or penalty points by the weight-based points. However, there is no more bonus point or penalty point if the utilization goes beyond the warm zone. Specifically, the CPU utilization cannot go beyond the high spot and the low spot using the weight-based points.

Figure 3:
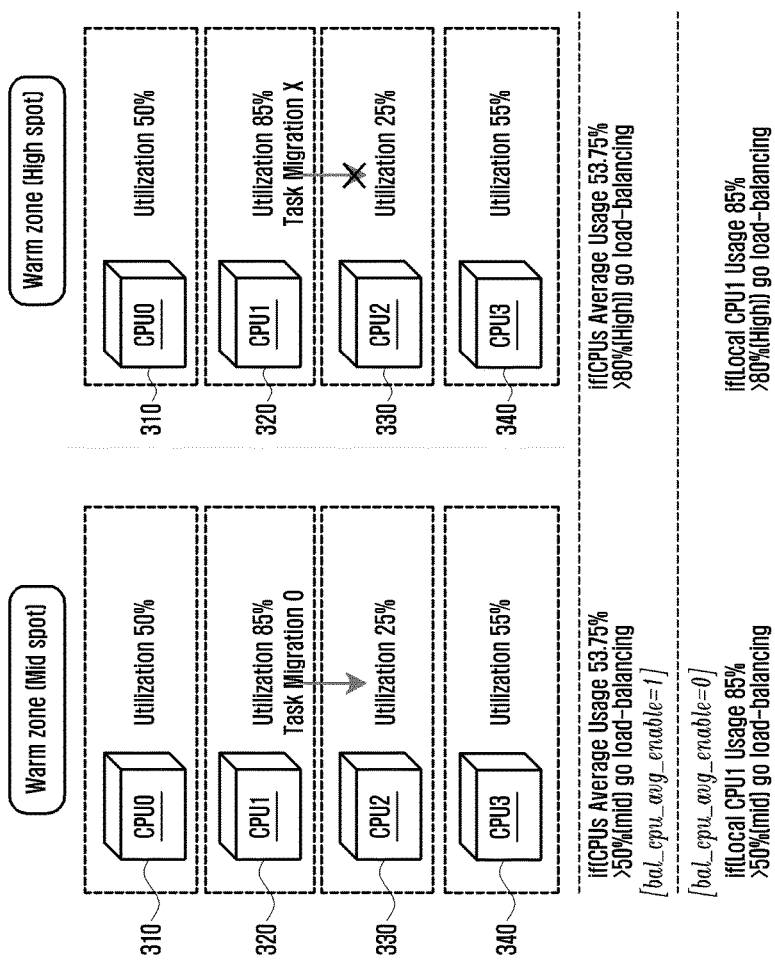
FIG. 3 is a diagram illustrating task migration in a warm zone policy, according to an embodiment of the present invention.

FIG. 3 is a diagram illustrating task migration in a warm zone policy, according to an embodiment of the present invention.

FIG. 3 assumes cases of utilizations of 50% (CPU0), 85% (CPU1), 25% (CPU2) and 55% (CPU3). If the policy given by the system administrator is "mid spot of the warm zone", load-balancing is performed only when the average utilization of the CPU is 50% or more. Since the average utilization is 53.75%, one of the tasks under execution in the run queue of CPU1, having the highest utilization, is moved to CPU2, having the lowest utilization. If the policy is "high spot of the warm zone", load-balancing is performed only when the average utilization of the CPU is 80% or more. Hence, task migration does not occur.

Figure 4:
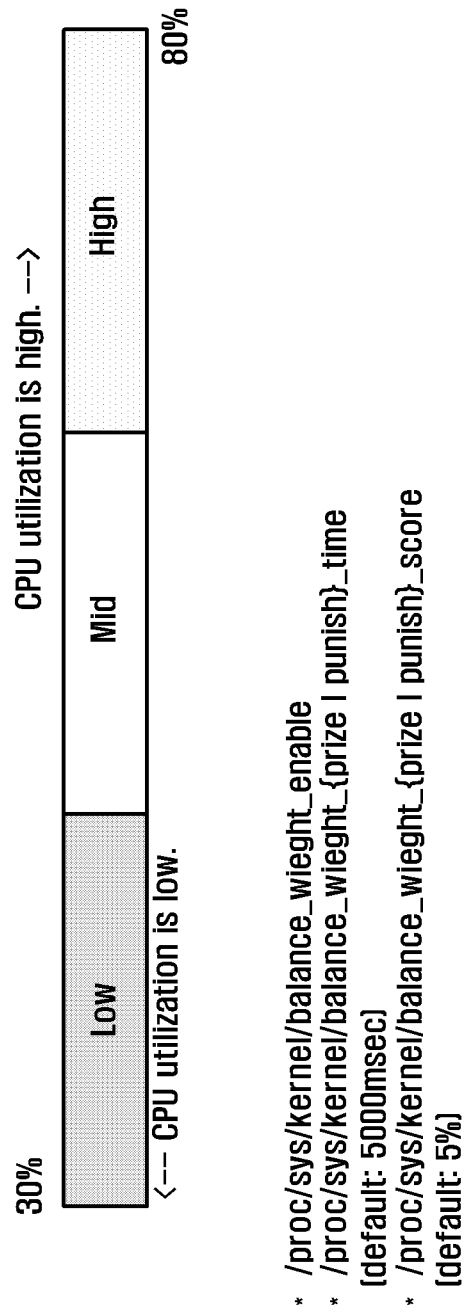
FIG. 4 is a diagram illustrating weight-based score management in a warm zone policy, according to an embodiment of the present invention.

FIG. 4 is a diagram illustrating weight-based score management in a warm zone policy, according to an embodiment of the present invention.

The load balancer, according to an embodiment of the present invention, applies weight-based points to the task so that the task may be continually performed in the CPU without movement if the usage period of the CPU of the task is a certain time, for example, greater than 5 seconds, the default value. The CPU usage time is calculated using the schedule information value of the task of the proc File System (procFS). If the task remains in the run queue for more than 5 seconds, 5 weight-based points are given. Here, −5 points means that the CPU utilization decreases (e.g., −5%). If the CPU utilization time of the task is 5 seconds or less, the task is given +5 weight-based points, which means that the CPU utilization increases (e.g., +5%).

The operation zone based load balancer, according to an embodiment of the present invention, purely performs an OS level Symmetric Multi-Processing (SMP) scheduler operation, and thus, the correction of the user application is not necessary. The operation zone based load balancer may minimize the latency costs of the real time system due to the load balancing of the CPU, while the load of each CPU does not reach 100% by flexibly processing the load balancing in the actual multi-core environment. Specifically, the following costs are resolved when an operation zone based load balancer, according to an embodiment of the present invention, performs load-balancing in a multi-core environment.

1. Latency cost: Cache invalidation is generated as many as the number of times in which the task is moved to another CPU for reduction of the CPU utilization. Whenever the migration kernel threshold having the highest priority moves a task from a CPU to another CPU, scheduling latency occurs in the tasks having a priority lower than the moved task.

2. Indirect cost: A non-preemptive period that lowers the real time performance increases due to the synchronization operation through the double locking for task migration. The battery life of the device is more quickly reduced due to the aggressive load-balancing operation.

The operation zone based load balancer flexibly manages the migration of the task in a multi-core based device. Specifically, the load balancer restricts inefficient task migration. Further, the load balancer controls CPUs so that the CPU utilization does not reach 100% through the operation zone policy. The load balancer provides an innovative advantage that minimizes power consumption of the device in a mobile environment that should use the battery for a long time. In addition, whenever the task is moved to another CPU, the information of the local cache is updated. Hence, the costs of cache invalidation and synchronization overhead generated by such an update may be reduced.

Figure 5:
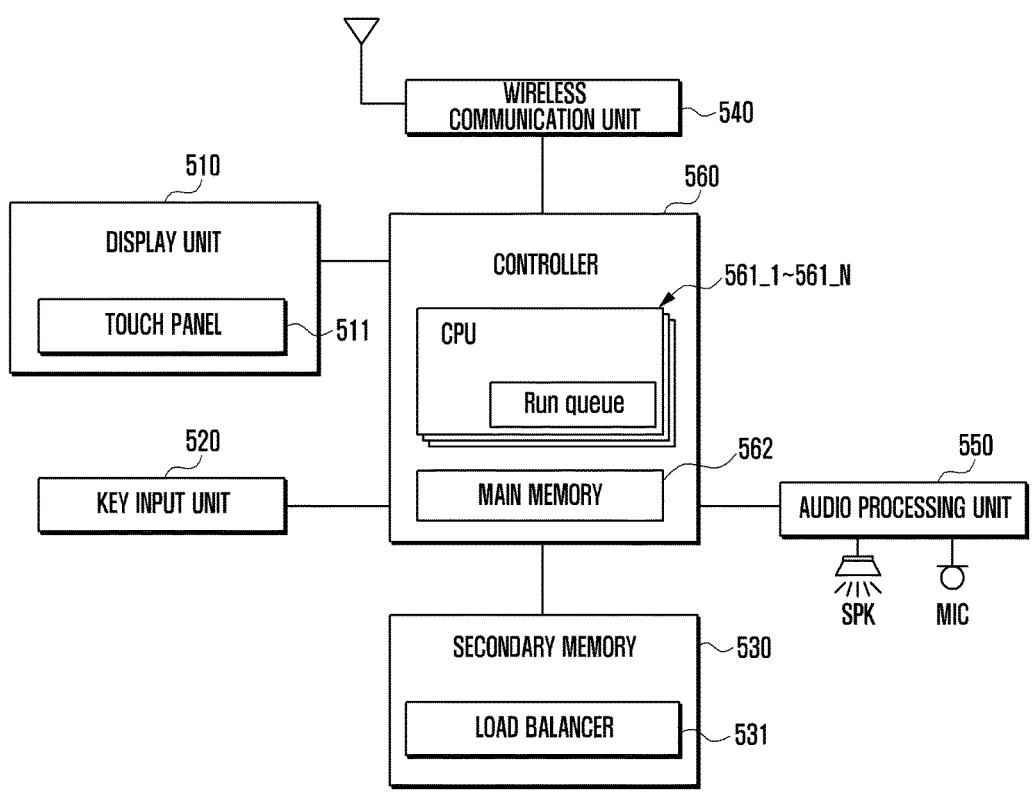
FIG. 5 is a block diagram illustrating a portable terminal, according to an embodiment of the present invention.

FIG. 5 is a block diagram of a portable terminal, according to an embodiment of the present invention.

Referring to FIG. 5, a portable terminal 500, according to an embodiment of the present invention, includes a display unit 510, a key input unit 520, a secondary memory 530, a wireless communication unit 540, an audio processing unit 550, a speaker (SPK), a microphone (MIC), and a controller 560.

The display unit 510 displays at least one image on a screen under the control of the controller 560. Specifically, if the controller 560 processes (e.g., decodes) data as "image to be displayed on a screen", and stores the processed image in the buffer, the display unit 510 converts the image stored in the buffer into analog signals, and displays the signals on the screen. If power is supplied to the display unit 510, the display unit 510 displays the lock image on the screen. In the state in which the lock image is displayed, when the lock release information (i.e., the password) is detected, the controller 560 releases the locking. That is, the display unit displays another image instead of the lock image under the control of the controller 560. The lock release information may be a text (e.g., 1234) that user has input to the portable terminal 500 using a keypad or a key input unit 520 displayed on the screen, a user's touch track on the display unit 510, a touch direction or type, or user's voice data input in the portable terminal 500 through the microphone (MIC). Further, another image is a home image, an application execution image, a keypad or menu, etc. The home image includes a background image and a plurality of icons displayed on the background image. The icons indicate each application or content (e.g., a picture file, a video file, a voice-recording file, a document, a message, etc.). If user selects one of the icons, for example, an application icon (e.g., taps the icon), the controller 560 controls the display unit 510 to execute the application and to display the execution image. The display unit 510 may display one of the images, for example, an application execution image as the background, and overlap the background with the keypad as the foreground and display the overlapped image under the control of the controller 560. Further, the display unit 510 displays the first image on the first area and displays the second image on the second area under the control of the controller 560. The display unit 510 may be composed of a Liquid Crystal Display (LCD), an Organic Light Emitting Diode (OLED), an Active Matrix Organic Light Emitting Diode (AMOLED), or a flexible display.

A touch panel 511 is placed on the display unit 510. Specifically, the touch panel 511 is implemented in an add-on type placed on the screen of the display unit 510, or an on-cell or in-cell type that is inserted in the display unit 510.

The touch panel 511 generates an analog signal (e.g., a touch event) in response to the user's gesture on the touch panel 511, converts analog signals into digital signals (A/D conversion) and transmits the converted signals to the controller 560. The touch event includes touch coordinates (x, y). The controller 560 determines that the touch device (e.g., a finger or a pen) has been touched on the touch panel 511 if touch coordinates are received from the touch panel 511, and determines that the touch has been released if touch coordinates are not received from the touch panel 511. Further, the controller 560 determines that the touch has been moved if the touch coordinates are changed from (x1, y1) to (x2, y2). The controller 560 calculates the position variation (dx, dy) of the touch and the moving speed of the touch, etc. in response to the movement of the touch. The controller 560 determines a user's gesture as one of a touch, a multi touch, a tap, a double tap, a long tab, a tap & touch, a drag, a flick, a press, a pinch-in, and a pinch-out, based on the touch coordinates, whether the touch has been released, whether the touch has been moved, and the position variation of the touch and the moving speed of the touch, etc. The touch panel may be a complex touch panel including a hand touch panel sensing a hand gesture and a pen touch panel sensing a pen gesture. The hand touch panel may be formed of a capacitive type. Of course, the hand touch panel may also be formed of a resistive type, an infrared type or a supersonic type. Further, the hand touch panel does not generate a touch event by only the user's hand gesture, and may generate a touch event by another object (e.g., an object of a conductive material that may apply a change of a capacitance). The pen touch panel may be formed of an electromagnetic induction type. As such, the pen touch panel generates a touch event by a stylus pen for a touch, which is manufactured to form a magnetic field.

The key input unit 520 may receive number or letter information, and may include a plurality of keys for setting various functions. Such keys may include, for example, a menu calling key, a screen on/off key, a power on/off key, a volume adjustment key, etc. The key input unit 520 may generate a key event related with the user setting and the function control of the portable terminal, and transmit the generated key event to the controller 560. The key event may include a power on/off event, a volume adjustment event, a screen on/off event, a shutter event, etc. The controller 560 may control the components in response to such a key event. Further, the key of the key input unit 520 may be called a hard key, and the virtual key displayed on the display unit 510 may be called a soft key. The secondary memory 520 may be formed of a disk, a Random Access Memory (RAM), a Read Only Memory (ROM), and a flash memory, etc. The secondary memory 530 stores information related with the load-balancing policy that is set by the system manager (e.g., at least one threshold for determining the load balancing, etc.). The secondary memory 530 stores a booting program, one or more operating systems and applications. Further, the secondary memory 530 stores the above-described load balancer 531. The operating system plays a role of an interface between hardware and an application and between applications, and manages computer resources such as, for example, a CPU, a Graphics Processing Unit (GPU), a main memory 562, an auxiliary memory 530, etc. The applications are classified into embedded applications and third party applications. For example, embedded applications are a web browser, an e-mail program, an instant messenger, etc. If power of the battery is supplied to the controller 560 of the portable terminal 500, first, a booting program is loaded to the main memory 562 of the controller 560. Such a booting program loads operating systems to the main memory 562. The operating system loads an application, for example, a load balancer 531, to the main memory 562.

The wireless communication unit 540 performs a voice call, a video call or a data communication with an external device through a network under the control of the controller 560. The wireless communication unit 540 includes a wireless frequency transmission unit that up-converts and amplifies the frequency of the transmitted signal, and a wireless frequency reception unit that low-noise-amplifies and down-converts the frequency of the transmitted signal. Further, the wireless communication unit 540 includes a mobile communication module (e.g., a 3-generation mobile communication module, 3.5-generation mobile communication module or 4-generation mobile communication, etc.), a digital broadcast module (e.g., a DMB module), a local area communication module (e.g, Wi-Fi), a Bluetooth module, and a Near Field Communication (NFC) module.

The audio processing unit 550 inputs and outputs audio signals (e.g., voice data) for voice recognition, voice recording, digital recording and a call in combination with a speaker (SPK) and a microphone (MIC). The audio processing unit 550 receives audio signals from the controller 560, D/A-converts the received audio signals into analog signals, amplifies the converted signals and outputs the amplified signals through the speaker (SPK). The audio processing unit 550 converts the audio signals received from the microphone (MIC) into digital signals, and provides the digital signals to the controller 560. The speaker (SPK) converts audio signals received from the audio processing unit 550 into sound waves, and outputs the sound waves. The microphone (MIC) converts the sound waves transmitted from a person or other sound sources into audio signals.

The controller 560 controls overall operation of the portable terminal 500 and a signal flow between internal components of the portable terminal 500, performs a function of processing data, and controls power supply from the battery to the components. The controller 560 includes a plurality of CPUs (561_1 to 561_N). As already known, a CPU is a core control unit of a computer system capable of calculating and comparing data, and analyzing and executing commands. The CPU includes various registers, for example, the above-described run-queue.

The controller 560 may include at least one GPU. The GPU is capable of calculating and comparing graphic-related data and analyzing and executing commands instead of the CPU. The CPU and the GPU may be integrated into one package in which two or more independent cores (e.g., a quad-core) form a single integrated circuit. Specifically, the CPUs 561_1 to 561_N may have been integrated into one multi-core processor. Further, a plurality of GPUs may have been integrated into one multi-core processor. The CPU and the GPU may have been integrated into one chip (System on Chip (SoC)). Further, the CPU and the GPU may have been packaged into a multi-layer. The configuration including the CPU and the GPU may be referred to as an Application Processor (AP).

The controller 560 includes a main memory unit 562, for example, a RAM. The main memory 562 stores various programs loaded from the secondary memory 530, for example, a booting program, an operating system and a load balancer 531. That is, the CPUs and the GPUs of the controller 560 access such a program, decrypt the command of the program, and execute the function corresponding to the decryption result. In particular, at least one of the CPUs executes the function of the load balancer 531. Further, the controller 560 includes a cache memory that temporarily stores data to be written in the secondary memory 530 and temporarily stores data read from the secondary memory 530.

The portable terminal may be modified in various ways according to the convergence trend of digital devices, and thus, not all modifications may be listed here, but the portable terminal 500 may further include components that are not mentioned above, such as, for example, a GPS module, a vibration motor, an accessory, an external device interface unit (e.g., an ear jack). The accessory may be a component that may be separated from the portable terminal 500, such as, for example, a pen for a touch on a touch screen. Further, the portable terminal 500 may exclude certain components from the above-described configuration, or may substitute certain components by other components.

Figure 6:
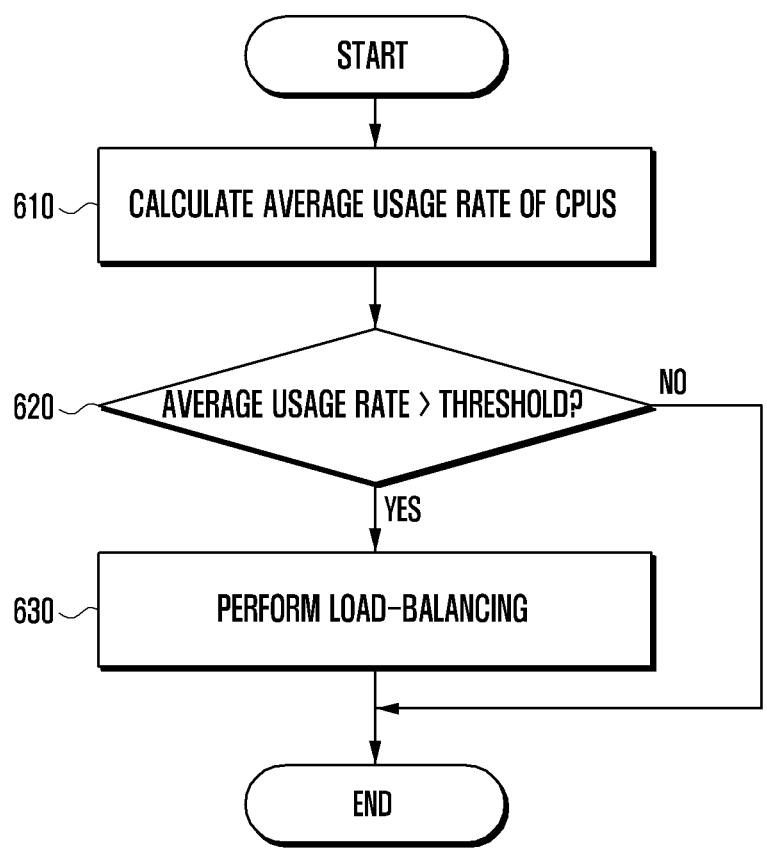
FIG. 6 is a flowchart illustrating a load-balancing method, according to an embodiment of the present invention.

FIG. 6 is a flowchart illustrating a load-balancing method, according to an embodiment of the present invention.

Referring to FIG. 6, at least one of the CPUs 561_1 to 561_N (hereinafter, referred to as the controller 560 for the convenience of explanation) determines whether the state of the task has been changed. If the state of the task has been changed, the controller 560 calculates utilization of each of the CPUs 561_1 to 561_N, in step 610. The above-described weight-based point may be added to or deducted from respective utilizations. Further, if the load-balancing policy is the warm zone, the controller 560 calculates the average utilization. The controller 560 determines whether the average utilization exceeds a predetermined threshold, in step 620. The threshold is determined as one of the above described high/middle/low spots. For example, if the portable terminal 500 is the mid spot policy, the threshold may be 50%. If the average utilization exceeds the threshold, the controller 560 performs a load balancing, in step 630. For example, one of the tasks under execution in the run queue of the CPU having the highest utilization among the CPUs 561_1 to 561_N is moved to the CPU having the lowest utilization.

Figure 7:
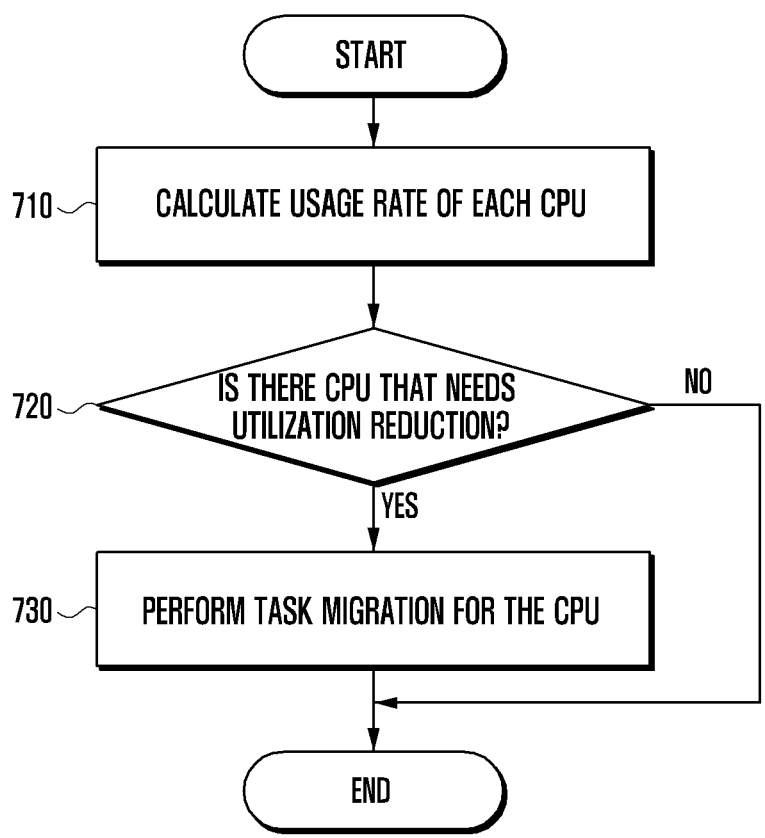
FIG. 7 is a flowchart illustrating a load-balancing method, according to another embodiment of the present invention.

FIG. 7 is a flowchart illustrating a load-balancing method, according to another embodiment of the present invention.

Referring to FIG. 7, the controller 560 determines whether the state of the task has been changed. If the state of the task has been changed, the controller 560 calculates respective utilizations of the CPUs 561_1 to 561_N, in step 710. At this time, the above-described weight-based point may be added to or deducted from each utilization. The controller 560 determines whether there is a CPU that needs the utilization reduction based on the calculated utilization, in step 720. First, the controller 560 checks the load-balancing policy set in the portable terminal 500. As a result, if the policy is the cold zone, the controller determines, for example, the CPU having the utilization of 30%, as the CPU that needs the reduction of the CPU utilization. If the policy is the hot zone, the controller 560 determines, for example, the CPU having the utilization of 80% as the CPU that needs the reduction in the CPU utilization. The controller 560 performs task migration for the determined CPU, in step 730.

Figure 8:
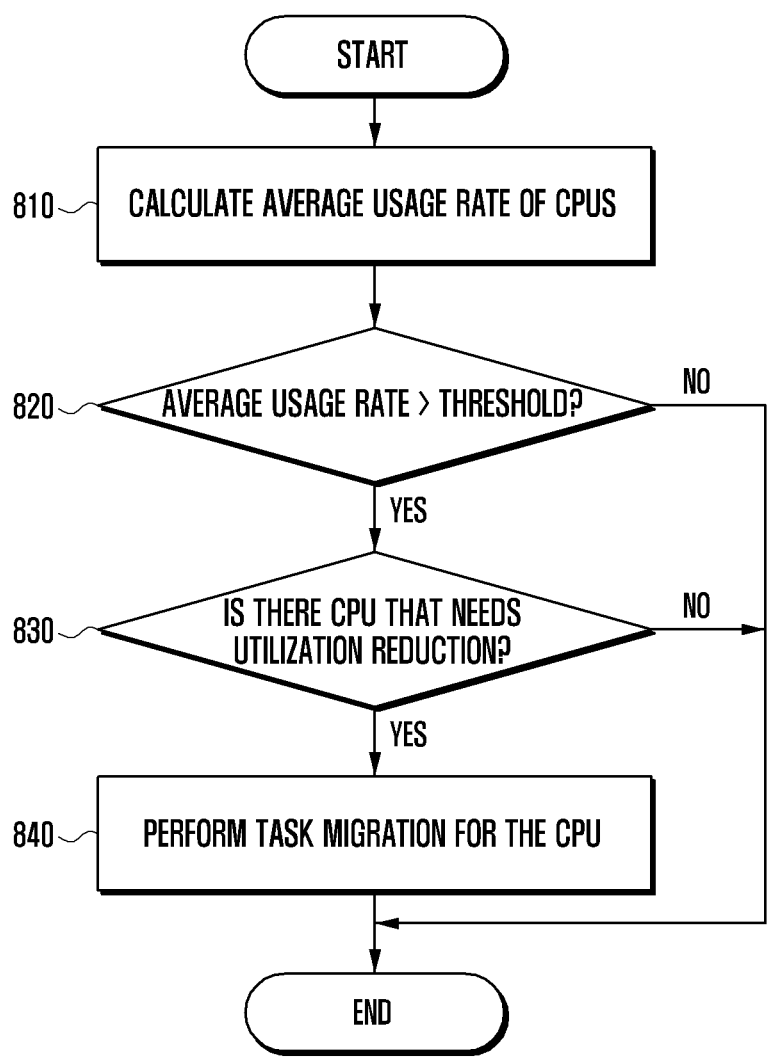
FIG. 8 is a flowchart illustrating a load-balancing method, according to another embodiment of the present invention.

FIG. 8 is a flowchart illustrating a load-balancing method, according to another embodiment of the present invention.

Referring to FIG. 8, the controller 560 determines whether the state of the task has been changed. If the state of the task has been changed, the controller 560 calculates respective utilizations of the CPUs 561_1 to 561_N, in step 810. At this time, the above-described weight-based point may be added to or deducted from the respective utilizations. Further, if the load-balancing policy is the warm zone, the controller 560 calculates the average utilization. The controller 560 determines whether the average utilization exceeds the average threshold, in step 820. The average threshold is determined as one of the above-described high/medium/low spots. For example, if the portable terminal 500 is the mid spot policy, the average threshold may be 50%. If the average utilization exceeds the average threshold, the controller 560 determines whether there is a CPU that needs the reduction in the utilization based on the calculated utilization rate, in step 830. The controller 560 determines a CPU, whose utilization exceeds the migration threshold, for example, 80%, as the CPU that needs the reduction in the utilization. The controller performs a task migration for the determined CPU, in step 840.

Figure 9:
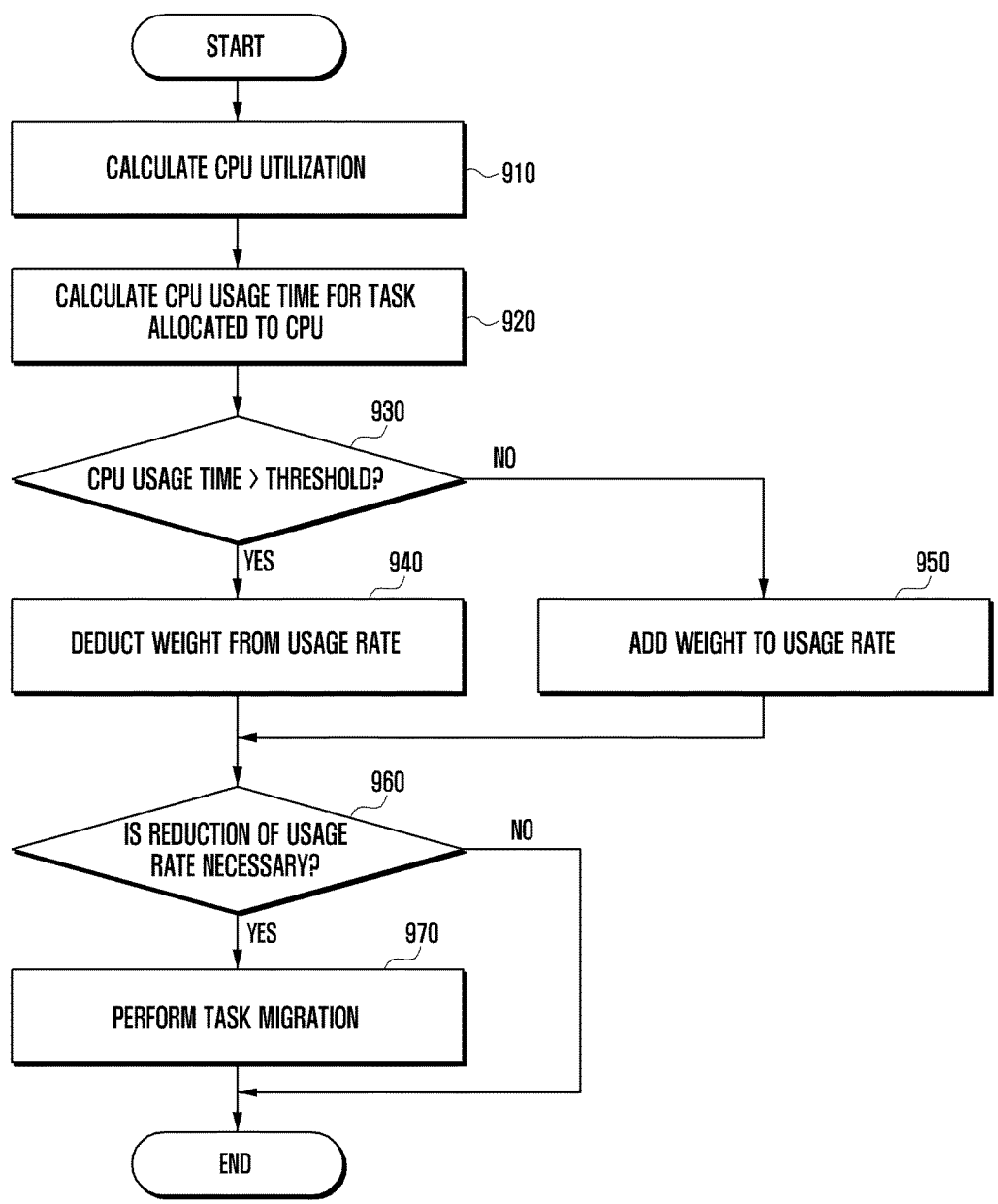
FIG. 9 is a flowchart illustrating a load-balancing method, according to another embodiment of the present invention.

FIG. 9 is a flowchart illustrating a load-balancing method, according to another embodiment of the present invention.

Referring to FIG. 9, the controller 560 determines whether the state of the task has been changed. If the state of the task has been changed, the controller 560 calculates the CPU utilization, in step 910. Further, if the load-balancing policy is the warm zone, the controller 560 calculates the CPU usage time for the task allocated to the CPU, in step 920. The controller 560 determines whether the CPU usage time has exceeded the time threshold (e.g., 5 seconds), in step 930. If the CPU usage time has exceeded the threshold, the controller deducts the weight (e.g., 5%) from the utilization, in step 940. If the CPU usage time does not exceed the threshold, the controller 560 adds the weight to the usage rate, in step 950. After step 940 or 950 is performed, the process moves to step 960. In an alternate embodiment of the present invention, step 950 may be omitted. Specifically, if the CPU usage time does not exceed the threshold, the procedure may move directly to step 960. The controller 560 determines whether the CPU utilization needs to be reduced based on the utilization to or from which the weight has been added or deducted, in step 960. For example, if the utilization exceeds the migration threshold (e.g., 80%), the controller 560 moves at least one of the tasks allocated to the CPU to another CPU.

The foregoing method for load-balancing of the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as, for example, hard disk, floppy disk, or magnetic tape, Optical Media such as Compact Disc Read Only Memory (CD-ROM) or Digital Versatile Disc (DVD), Magneto-Optical Media such as floptical disk, and a hardware device such as, for example, ROM, RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

As described above, the present invention provides a method and portable terminal for flexibly performing a load-balancing based on the use rate of a CPU.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A load-balancing method in a portable terminal having a plurality of Central Processing Units (CPUs), the load-balancing method comprising:
    calculating a utilization for each of the plurality of CPUs, when a state of a task is changed, wherein the state of a task is changed based on at least one of when the task is generated and when the task is awakened from an idle state;
    calculating CPU usage times of tasks allocated to the respective CPUs;
    adjusting the utilization for each of the plurality of CPUs based on a calculated CPU usage time;
    calculating an average of the utilizations of the plurality of CPUs; and
    if the calculated average exceeds a predetermined threshold, wherein the predetermined threshold is determined based on a load-balancing policy, performing task migration of at least one task, which is allocated to one or more of the plurality of CPUs that needs a utilization reduction, to another one of the plurality of CPUs,
    wherein the adjusting of the utilization for each of the plurality of CPUs further comprises:
        deducting a predetermined weight from the utilization of a CPU, when the calculated CPU usage time exceeds a respective preset time threshold; or
        adding the predetermined weight to the utilization of the CPU, when the calculated CPU usage time does not exceed the time threshold,
    wherein the predetermined weight is associated with increasing or decreasing utilization of the respective CPUs and determined based on the load-balancing policy,
    wherein the load-balancing policy set in the portable terminal is one of a hot zone policy, a warm zone policy, and a cold zone policy, set based on CPU utilization, and
    wherein the predetermined threshold comprises one of a low spot, a mid spot, and a high spot set within the warm zone policy, when the load-balancing policy set in the portable terminal is the warm zone policy.

2. The load-balancing method of claim 1, wherein performing task migration comprises performing task migration of a task allocated to a first CPU, having a highest utilization, to a second CPU, having a lowest utilization.

3. The load-balancing method of claim 1, wherein the state of the task is changed when the task is under execution and belongs to a busiest scheduling group.

4. portable terminal comprising:
    a secondary memory;
    a main memory for storing programs loaded from the secondary memory; and
    a plurality of Central Processing Units (CPUs) for accessing the main memory, decrypting commands of the programs, and executing a function according to a result of the decryption,
    wherein, based on at least one of when a state of a task is generated and the task is awakened from an idle state, at least one of the plurality of CPUs calculates utilizations of the plurality of CPUs, calculates CPU usage times of tasks allocated to the respective CPUs, adjusts the utilization for each of the plurality of CPUs based on a calculated CPU usage time, calculates an average of the utilizations of the plurality of CPUs, and performs, if the calculated average exceeds a predetermined threshold, wherein the predetermined threshold is determined based on a load-balancing policy, task migration of at least one task, which is allocated to one or more of the plurality of CPUs that needs a utilization reduction, to another one of the plurality of CPUs,
    wherein the adjusting of the utilization for each of the plurality of CPUs further comprises:
        deducting a predetermined weight from the utilization of a CPU, when the calculated CPU usage time exceeds a respective preset time threshold; or
        adding the predetermined weight to the utilization of the CPU, when the calculated CPU usage time does not exceed the time threshold,
    wherein the predetermined weight is associated with increasing or decreasing utilization of the respective CPUs and determined based on the load-balancing policy,
    wherein the load-balancing policy set in the portable terminal is one of a hot zone policy, a warm zone policy, and a cold zone policy, set based on CPU utilization, and
    wherein the predetermined threshold comprises one of a low spot, a mid spot, and a high spot set within the warm zone policy, when the load-balancing policy set in the portable terminal is the warm zone policy.

5. The portable terminal of claim 4, wherein at least one of the plurality of CPUs performs task migration of a task allocated to a first CPU, having a highest utilization, to a second CPU, having a lowest utilization.

6. The portable terminal of claim 4, wherein the state of the task is changed when the task is under execution and belongs to a busiest scheduling group.

* * * * *